US012779668B2

(12) United States Patent
Youn

(10) Patent No.: US 12,779,668 B2
(45) Date of Patent: Nov. 3, 2026

(54) EDUCATIONAL SOFT ROBOT KIT

(71) Applicant: Hye Jun Youn, Seoul (KR)

(72) Inventor: Hye Jun Youn, Seoul (KR)

( * ) Notice: Subject to any disclaimer, the term of this patent is extended or adjusted under 35 U.S.C. 154(b) by 267 days.

(21) Appl. No.: 18/606,161

(22) Filed: Mar. 15, 2024

(65) Prior Publication Data

US 2024/0308065 A1 Sep. 19, 2024

(30) Foreign Application Priority Data

Mar. 17, 2023 (KR) ........................ 10-2023-0034934

(51) Int. Cl.
*B25J 9/14* (2006.01)
*G09B 19/00* (2006.01)

(52) U.S. Cl.
CPC .......... *B25J 9/142* (2013.01); *G09B 19/0069* (2013.01)

(58) Field of Classification Search
CPC .... G09B 25/025; G09B 19/0069; B25J 18/06; B25J 9/142
See application file for complete search history.

(56) References Cited

U.S. PATENT DOCUMENTS 4,784,042 A * 11/1988 Paynter ................. F15B 15/103 92/92
9,624,911 B1 * 4/2017 Griffith .................. F24S 23/74
11,286,144 B2 * 3/2022 Lessing .................... B25J 9/142

FOREIGN PATENT DOCUMENTS

| | | |
|---|---|---|
| CN | 107380290 | 11/2017 |
| JP | 2018-512304 | 5/2018 |
| JP | 2018-199216 | 12/2018 |
| KR | 10-2017-0130144 | 11/2017 |
| KR | 10-1950654 | 2/2019 |
| KR | 10-2133497 | 7/2020 |

OTHER PUBLICATIONS

Office Action issued in corresponding Korean Application No. 10-2023-0034934, dated Mar. 10, 2025. (Korean Translation Only).
Youn et al., "PneuBots: Modular Inflatables for Playful Exploration of Soft Robotics", ACM SIGCHI, Apr. 7, 2022, (youtube.com/watch?v=FAUJDtaaekk).

* cited by examiner

*Primary Examiner* — Abiy Teka
(74) *Attorney, Agent, or Firm* — NORTON ROSE FULBRIGHT US LLP

(57) ABSTRACT

The present invention relates to an educational soft robot kit, and more particularly, to an educational soft robot kit through which can educate the technology of operation and detection of soft robots through programmed algorithms and experience and learn the operation of soft robots through various assemblies. The educational soft robot kit according to an aspect of the present invention includes an assembly tube, a connector, an air line, and a controller.

24 Claims, 15 Drawing Sheets

EDUCATIONAL SOFT ROBOT KIT

CROSS-REFERENCE TO RELATED APPLICATION

This application claims priority to and the benefit of Korean Patent Application No. 10-2023-0034934, filed on Mar. 17, 2023, the disclosure of which is incorporated herein by reference in its entirety.

FIELD OF THE DISCLOSURE

The present invention relates to an educational soft robot kit, and more particularly, to an educational soft robot kit through which can educate the technology of operation and detection of soft robots through programmed algorithms and experience and learn the operation of soft robots through various assemblies.

DESCRIPTION OF RELATED ART

Generally, soft robots refer to robots made of flexible and stretchable materials such as polymers and rubber instead of hard materials such as metals used in conventional robots.

These soft robots are actively being developed to be applicable not only in industrial sites but also in living environments, and are also attracting great attention in human computer interaction (HCl) and haptic communities.

Soft robots are characterized by easy deformation and soft movement, and mainly apply hydraulic or pneumatic pressure to the robot's structure to generate movement using the phenomenon that the structure swells like a balloon.

In order to inflate the robot into a desired direction and shape to generate the intended movement, soft robots mainly use differences in material characteristics.

Meanwhile, soft robots can move flexibly, so they can be used in various fields such as medical care, exploration, disaster, and manufacturing.

For example, soft robots can be used as various robots, such as robots that pass through obstacles, robots that gently grip objects, robots that can move objects to different positions, and energy generators.

As an example of such a soft robot, Korea Patent Registration No. 10-2133497 titled "soft gripper unit and soft robot apparatus having the same" presents a soft robot that is connected to a plurality of body parts and performs an operation through the injected air pressure.

However, there is a problem in that these soft robots have a complex structure and require a lot of time and education to learn the techniques of operation and detection of soft robots.

In order to solve this problem, various educational institutions such as schools, academies, and scientific organizations are conducting soft robot education, programming for soft robot control, and related education.

This education teaches the movement, detection, and operation principles of soft robots and programming that controls them, and aims to enable the general public to learn the operating principles necessary to make soft robots or implement various patterns of motion.

However, such conventional soft robot education is not an integrated education such as learning only with the theory of the structure of the robot, the principle of operation, and programming that controls them, or even if practiced, it is not a dual education such as studying only programming processes or practical members that show some structure of the soft robot, and thus, there was no practical education for comprehensive understanding.

Of course, it is known that educational soft robot kits are being developed to solve these problems, but to date, there are no educational soft robot kits that can achieve a meaningful level of education.

In addition, most of the conventional robot kits were prototypes for research purposes and were often not easily available to the general public.

Accordingly, there is an urgent need to develop an educational soft robot kit that allows the general public to easily access educational soft robot kits and to experience and learn the operation of soft robots by applying various structures, configurations, and programming of soft robots.

SUMMARY OF THE INVENTION

The present invention is to solve the above problems, and is directed to providing an educational soft robot kit through which can educate the technology of operation and detection of soft robots through programmed algorithms and experience and learn the operation of soft robots through various assemblies.

In addition, the present invention is also directed to providing an educational soft robot kit that allows the general public to easily get into soft robots through various assembling tubes as well as easily understanding the structure of soft robots through multiple assembly tubes.

The problems of the present invention are not limited to those mentioned above, and other problems not mentioned will be clearly understood by those of ordinary skill in the art from the following description.

According to an aspect of the present invention, a educational soft robot kit is provided.

The educational soft robot kit includes a assembly tube having a tubular body having a sealed internal space, at least one air inlet provided in the body, and a fusion pattern that is fused while forming a passage through which air flows in the internal space of the body; a connector having a penetrated hollow and at least two ends with an opening hole formed in a tubular shape, the ends being connected to the at least one air inlet; an air line connected to an end of the connector that is not connected to the air inlet; and a controller configured to control to inject or suck air into/from the air line according to a preset programmed algorithm to control the at least one assembly tube to perform at least one operation of expansion, contraction, curling, bending, and distortion according to the amount of air injected thereto.

Meanwhile, the assembly tube includes a first type tube.

In this case, the fusion pattern forms a rhombus fusion pattern having a rhombus shape.

The assembly tube includes a first type tube that has the at least one rhombus fusion pattern and is folded to perform a bending operation according to the amount of air injected thereto.

Meanwhile, the first type tube includes a shape A tube including: a body having a rectangular sealed inner space having a long horizontal length; a rhombus fusion pattern in which a vertical diagonal formed at the center of the body has a length longer than a horizontal diagonal; and a first air inlet disposed on the left or right side of the rhombus fusion pattern.

In this case, the shape A tube may further include a second air inlet disposed on the right or left side of the rhombus fusion pattern.

Meanwhile, the first type tube includes a shape B tube including: a body having a rectangular sealed inner space having a long horizontal length; a first rhombus fusion pattern in which a vertical diagonal formed on the left side of the body has a length longer than a horizontal diagonal; a second rhombus fusion pattern in which a vertical diagonal formed on the right side of the body has a length longer than a horizontal diagonal; and an air inlet disposed between the first rhombus fusion pattern and the second rhombus fusion pattern.

Meanwhile, the first type tube includes a shape C tube including: a body having a sealed inner space of a preset shape; a rhombus fusion pattern in which a horizontal diagonal formed at the center of the body has a length longer than a vertical diagonal; and a first air inlet disposed on the left or right side of the rhombus fusion pattern.

In this case, the shape C tube may further include a second air inlet disposed on the right or left side of the rhombus fusion pattern.

Additionally, the body of the shape C tube may have an eye-shaped appearance.

Meanwhile, the assembly tube includes a second type tube.

In this case, the fusion pattern forms a straight-line fusion pattern having a straight-line shape.

The assembly tube includes a second type tube that has at least one straight-line fusion pattern and performs a longitudinal contraction or curl operation according to the amount of air injected thereto.

Meanwhile, the second type tube includes a shape D tube including: a body having a rectangular, sealed inner space having a long horizontal length; a plurality of straight-line fusion patterns having intervals along the length direction of the body and arranged in the same direction; and a first air inlet disposed on the left or right side of the straight-line fusion pattern.

In this case, the shape D tube may further include a second air inlet disposed on the right or left side of the straight-line fusion pattern.

In this case, the straight-line fusion pattern is divided into a plurality of upper straight-line fusion patterns having an interval and arranged on an upper side of the body; and a plurality of lower straight-line fusion patterns having an interval and arranged on a lower side of the body.

Additionally, preferably, the upper straight-line fusion pattern and the lower straight-line fusion pattern have the same direction and are formed at equal intervals; and have an in-between interval between the corresponding upper straight-line fusion pattern and the lower straight-line fusion pattern to form an air passage.

Meanwhile, the assembly tube includes a third type tube.

In this case, the fusion pattern forms an inclined line fusion pattern having an inclined line shape.

The assembly tube includes a third type tube that has at least one inclined line fusion pattern and performs a contraction, curl, or distortion operation according to the amount of air injected thereto.

Meanwhile, the third type tube includes a shape E tube including: a body having a rectangular, sealed inner space having a long horizontal length; a plurality of inclined line fusion patterns having intervals along the length direction of the body and arranged in the same direction; and a first air inlet disposed on the left or right side of the inclined line fusion pattern.

In this case, the shape E tube may further include a second air inlet disposed on the right or left side of the inclined line fusion pattern.

Meanwhile, the inclined line fusion pattern is divided into upper inclined line fusion patterns having an interval and arranged on an upper side of the body; and lower inclined line fusion patterns having an interval and arranged on a lower side of the body.

In this case, preferably, the upper inclined line fusion pattern and the lower inclined line fusion pattern have the same angle and direction and are formed at equal intervals; and have an in-between interval between the corresponding upper inclined line fusion pattern and the lower inclined line fusion pattern to form an air passage.

Meanwhile, the assembly tube includes a fourth type tube.

In this case, the fusion pattern forms a plane figure fusion pattern having a circular or polygonal shape.

The assembly tube includes a fourth type tube that forms a body having a circular or polygonal sealed inner space, and at least one of the above plane figure fusion patterns on the body, and performs an operation of expanding or restoring according to the amount of air injected thereto.

Meanwhile, the fourth type tube includes a shape F tube including: a body having five protrusions protruding in a star shape and a sealed inner space; a first air inlet disposed at the first protrusion of the body; a second air inlet disposed at the second protrusion of the body; a third air inlet disposed at the third protrusion of the body; a fourth air inlet disposed at the fourth protrusion of the body; a fifth air inlet disposed at the fifth protrusion of the body; and a plane figure fusion pattern disposed at the center of the body.

Meanwhile, the fourth type tube includes a shape G tube including: a body having three protrusions protruding in a triangular shape and a sealed inner space; a first air inlet disposed at the first protrusion of the body; a second air inlet disposed at the second protrusion of the body; a third air inlet disposed at the third protrusion of the body; and a plane figure fusion pattern disposed at the center of the body.

The connector applied to the educational soft robot kit according to an embodiment of the present invention may have any one of a linear shape, a T-shape, or a cross shape.

The controller applied to the educational soft robot kit according to an embodiment of the present invention may include a main body to which the at least one air line is connected; an air pressure control unit provided inside or outside the main body to inject or suck air into/from the air line; and a control unit that is linked to an external input device through a network to store a preset programmed algorithm and controls an operation of the air pressure control unit according to the algorithm.

The assembly tube applied to the educational soft robot kit according to an embodiment of the present invention may be made by a thermal compression manufacturing process in which two layers of PVC film or TPU film are overlapped on a preset-shaped mold, then pressed and sealed while heated according to the shape of the body and the shape of the fusion pattern, and cut according to the shape.

According to the above configuration, the educational soft robot kit according to the present invention has the effect of easily learning the technology of operation and detection of soft robots by assembling assembly tubes and connectors having various patterns and controlling them using a controller.

In addition, it can implement from a simple soft robot type to a complex soft robot type using seven types of assembly tubes and three types of connectors, thereby making it possible to experience and learn a wider range of soft robot operations.

In addition, through various assemblies, the operating principles can be analyzed along with the development of new soft robot forms, so it can be used by everyone from the general public to designers, artists, and programmers to identify problems with soft robots, correct them, supplement them, and improve them.

In addition, the fusion pattern of the assembly tube can perform at least any one of expansion, restoration, contraction, curling, bending, and distortion operations according to the amount of air injected thereto to more easily convey the understanding of the basic structure and operating principle of the soft robot.

Advantageous effects of the present invention are not limited to the above-described effects, and should be understood to include all effects that can be inferred from the configuration of the invention described in the detailed description or claims of the present invention.

DETAILED DESCRIPTION OF THE EMBODIMENTS

Figure 1:
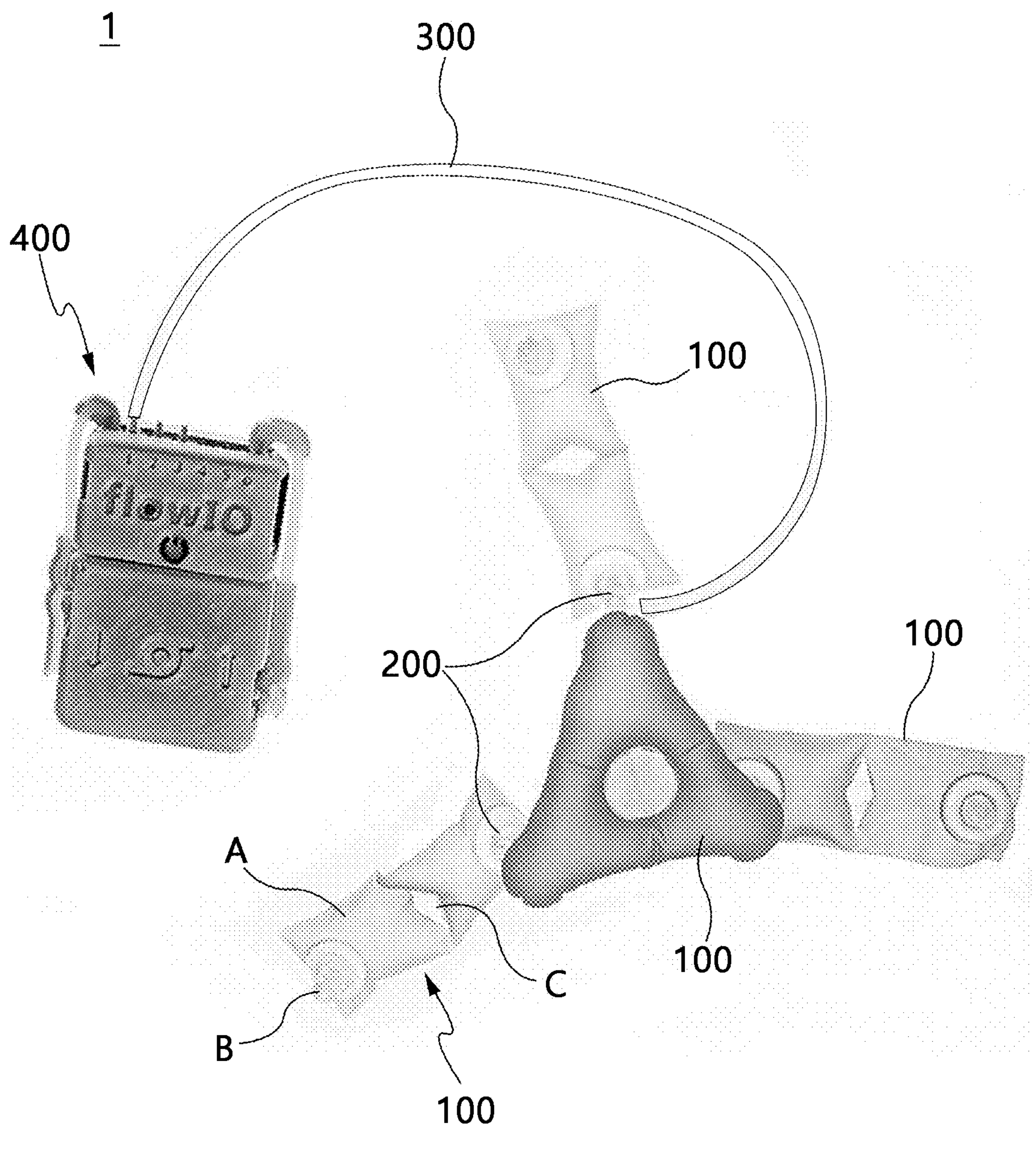
FIG. 1 is a schematic diagram substitute photograph showing an educational soft robot kit according to an embodiment of the present invention.

Hereinafter, exemplary embodiments of the present invention will be described in detail so that those of ordinary skill in the art can readily implement the present invention with reference to the accompanying drawings. The present invention may be embodied in many different forms and is not limited to the embodiments set forth herein. In the drawings, parts unrelated to the description are omitted for clarity of description of the present invention, and throughout the specification, same or similar reference numerals denote same elements.

Terms and words used in the present specification and claims should not be construed as limited to their usual or dictionary definition. They should be interpreted as meaning and concepts consistent with the technical idea of the present invention, based on the principle that inventors may appropriately define the terms and concepts to describe their invention in the best way.

Accordingly, the embodiments described in the present specification and the configurations shown in the drawings correspond to preferred embodiments of the present invention, and do not represent all the technical idea of the present invention, so the configurations may have various examples of equivalent and modification that can replace them at the time of filing the present invention.

It should be understood that the terms "comprise" or "have" or the like when used in this specification, are intended to describe the presence of stated features, integers, steps, operations, elements, components and/or a combination thereof but not preclude the possibility of the presence or addition of one or more other features, integers, steps, operations, elements, components, or a combination thereof.

The presence of an element in/on "front", "rear", "upper or above or top" or "lower or below or bottom" of another element includes not only being disposed in/on "front", "rear", "upper or above or top" or "lower or below or bottom" directly in contact with other elements, but also cases in which another element being disposed in the middle, unless otherwise specified. In addition, unless otherwise specified, that an element is "connected" to another element includes not only direct connection to each other but also indirect connection to each other.

Additionally, in describing the present invention, detailed descriptions of related known functions or configurations will be omitted in order to not obscure the gist of the present invention.

Hereinafter, a educational soft robot kit according to an embodiment of the present invention will be described with reference to the accompanying drawings.

FIG. 1 is a schematic diagram substitute photograph showing an educational soft robot kit according to an embodiment of the present invention.

As shown, the educational soft robot kit 1 according to an embodiment of the present invention is designed to educate the technology of operation and detection of the soft robot through a programmed algorithm, and to experience and learn the operation of the soft robot through various assemblies.

To this end, the educational soft robot kit 1 according to an embodiment of the present invention includes an assembly tube 100 that shows the basic operation of a soft robot through a single or multiple combinations, a connector 200 that easily connects the assembly tube 100, an air line 300 that forms a passage for air injection or suction, and a controller 400 that controls the operation of the assembly tube 100.

First, the assembly tube 100 has a preset shape and can perform the intended movement desired by the user according to air injection through the formation of various fusion patterns (C).

These assembly tubes 100 have a structure in which single or multiple assembly tubes can be connected and assembled.

In a specific embodiment, the assembly tube 100 has a tubular body (A) having a sealed internal space, at least one air inlet (B) provided in the body (A), and a fusion pattern (C) that is fused while forming a passage through which air flows in the internal space of the body (A).

As will be described later, in the embodiment of the present invention, the assembly tube 100 is preferably shown to have seven shapes, but is not limited thereto, and of course, if necessary, the assembly tube 100 may have various shapes depending on the pattern shape of the fusion pattern (C) and the shape of the body (A).

Meanwhile, the connector 200 serves to connect the assembly tube 100 and another assembly tube 100, and has a tubular shape having a penetrated hollow.

In an embodiment of the present invention, the connector 200 has a hard tubular shape to facilitate coupling, and preferably has three types to be described later, but the present invention is not limited thereto.

Of course, if necessary, the connector 200 may be formed of a soft tube.

However, the connector 200 has a penetrated hollow 210 to allow air to flow therein, and at least two ends 220 with an opening hole formed in communication with the hollow. Additionally, it has a structure in which an end 220 with an opening hole formed is inserted into at least one air inlet (B).

Accordingly, the connector 200 communicates at least one assembly tube 100 and serves as a passage through which air is injected or sucked into/from the assembly tube 100 through the air line 300 and the controller 400 described later (see FIG. 16).

Additionally, the air line 300 is a soft tube with a preset length and is connected to an end 220 of the connector 200 that is not connected to the air inlet (B), and serves as a passage through which air flows into the internal space under the control of the controller 400.

The length of the air line 300 is not limited, and of course, a plurality of air lines having different lengths may be used as necessary.

Meanwhile, the controller 400 injects or sucks air supplied from an air pressure control unit 420 formed on the inner or outer one side into/from the assembly tube 100 described above according to a preset programmed algorithm.

Under the control of the controller 400, the assembly tube 100 performs operations such as curl and bending by the fusion pattern (C) through expansion or contraction.

In other words, the controller 400 serves to inject or suck air into/from the air line 300 according to a preset programmed algorithm to control at least one assembly tube 100 to perform at least one operation of expansion, restoration, contraction, curling, bending, and distortion according to the amount of air injected thereto.

Figure 2:
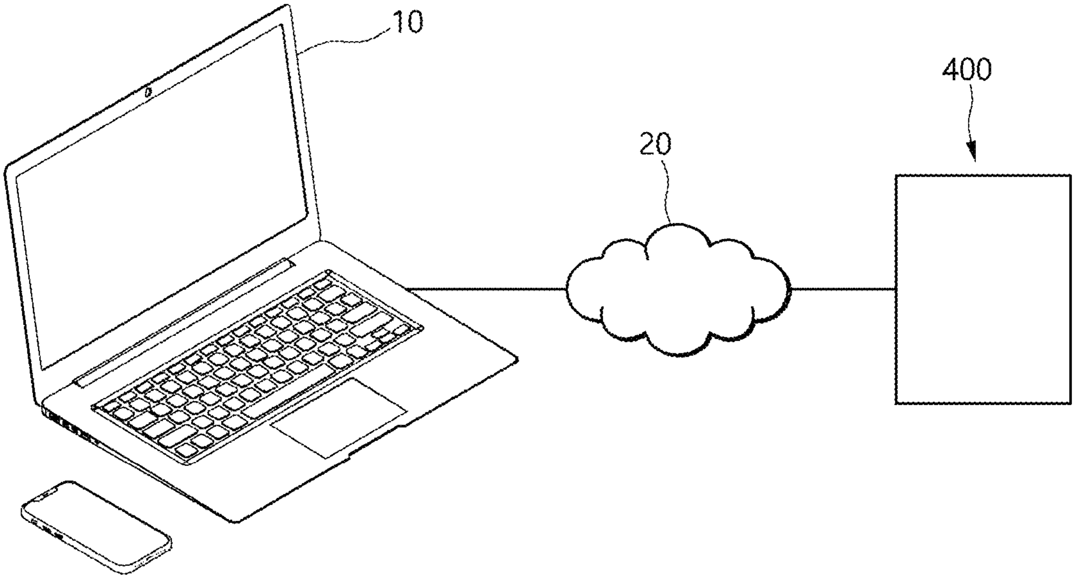
FIG. 2 is a diagram showing an example of using a controller applied to an educational soft robot kit according to an embodiment of the present invention.
Figure 3:
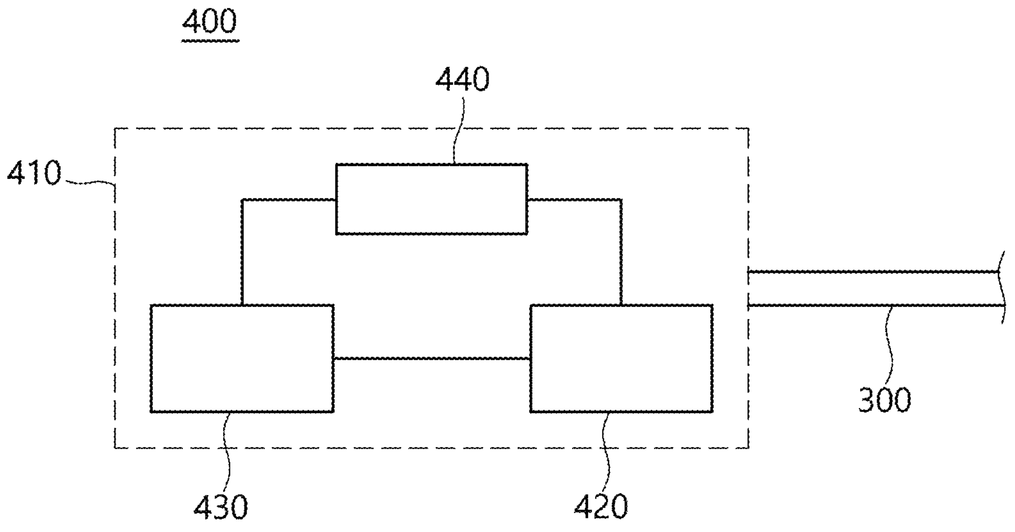
FIG. 3 is a schematic diagram showing a controller applied to an educational soft robot kit according to an embodiment of the present invention.

FIG. 2 is a diagram showing an example of using a controller applied to an educational soft robot kit according to an embodiment of the present invention, and FIG. 3 is a schematic diagram showing a controller applied to an educational soft robot kit according to an embodiment of the present invention.

Referring to FIGS. 2 and 3, an example of the controller 400 applied to the educational soft robot kit 1 according to an embodiment of the present invention will be described in more detail as follows.

As described above, the controller 400 controls the operation of at least one or more connected assembly tubes 100 according to a preset programmed algorithm.

Through operation control of the assembly tube 100, the user may learn the technology of operation and detection of the soft robot, and may experience and learn the operation of the soft robot.

As an example, the controller 400 includes a main body 410 to which at least one air line 300 is connected; an air pressure control unit 420 provided inside or outside the main body 410 to inject or suck air into/from the air line 300; and a control unit 430 that is linked to an external input device 10 through a network 20 to store a preset programmed algorithm and controls the operation of the air pressure control unit 420 according to the algorithm.

In addition, if necessary, the controller 400 may have a structure including an external display or a button (key) type manipulation unit 440 so that the user can easily operate it.

The external input device 10 may be in the form of an input device such as a conventional PC, laptop, smartphone, or specific server, and of course, if a user may code a specific computer program using a specific programming language, various input devices may be applied.

The external input device 10 is linked to the controller 400 through the network 20, and the above-described network 20 is a generally known wired or wireless communication network and may be a data communication network such as 2G, 3G, 4G, WiFi, LAN, or Bluetooth.

Meanwhile, the air pressure control unit 420 is provided inside or outside the main body 410 to control air pressure through air injection.

In detail, the air pressure control unit 420 may implement a direct soft robot operation of the assembly tube 100 by injecting or sucking air into/from the assembly tube 100 through the air line 300 according to a preset programmed algorithm stored in the control unit 430 to be described later.

In an embodiment, the air pressure control unit 420 is illustrated as being included in the main body 410 of the controller 400, but is not limited thereto, and of course, the air pressure control unit 420 may have a structure separately provided outside the main body 410.

Meanwhile, the air pressure control unit 50 may be an air compressor.

Meanwhile, the control unit 430 stores a programmed algorithm and controls the operation of the assembly tube 100 constituting the soft robot kit 1 according to the algorithm.

The control unit 430 for this may be in the form of a micro controller unit (MCU), and may include a storage device in which a programmed algorithm is stored.

Such a storage device may be at least one of a flash memory type, a hard disk type, a media card micro type, a card-type memory (e.g., SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Under the control of the controller 400 described above, the connected at least one assembly tube 100 is controlled to perform operations such as expansion, restoration, contraction, curl, bending, and distortion according to the amount of air injected thereto.

Figure 4:
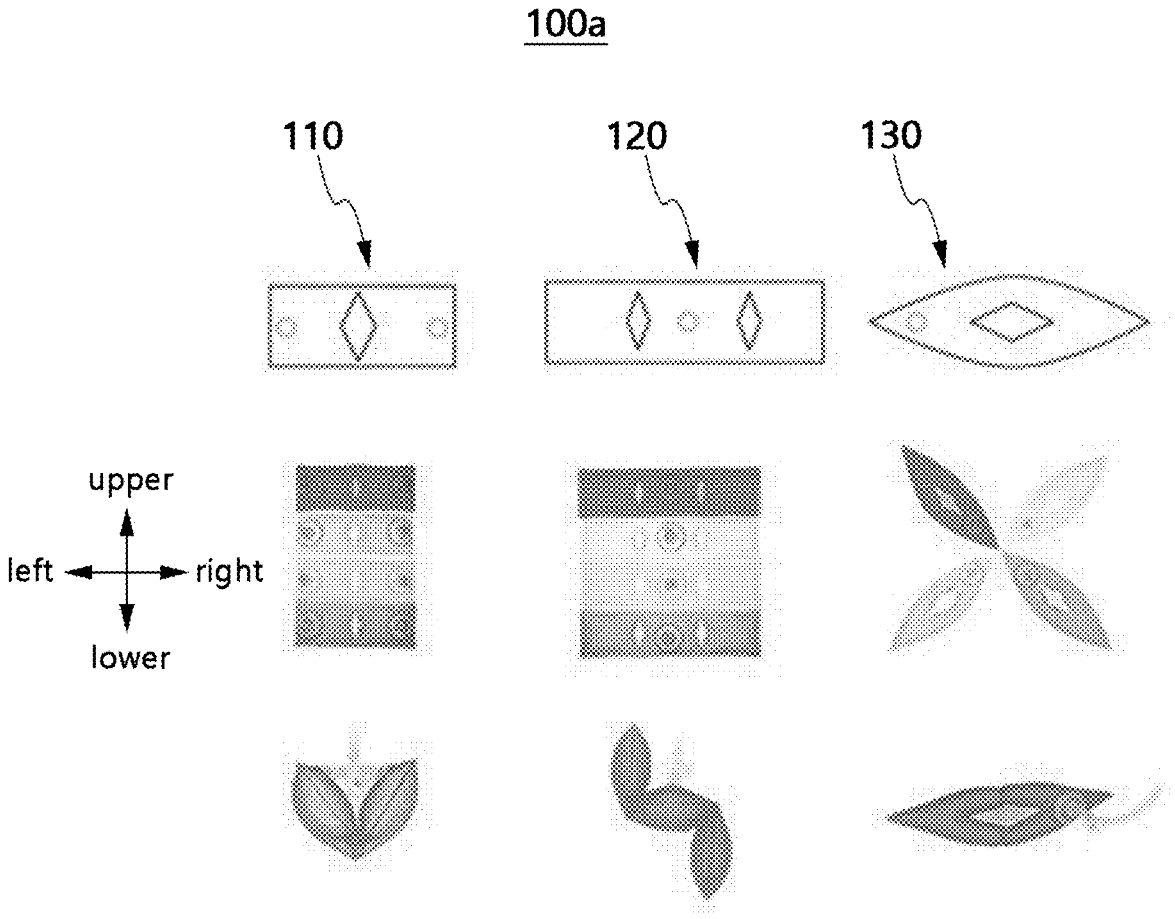
FIG. 4 is a diagram showing a first type tube of an assembly tube applied to an educational soft robot kit according to an embodiment of the present invention.
Figure 5:
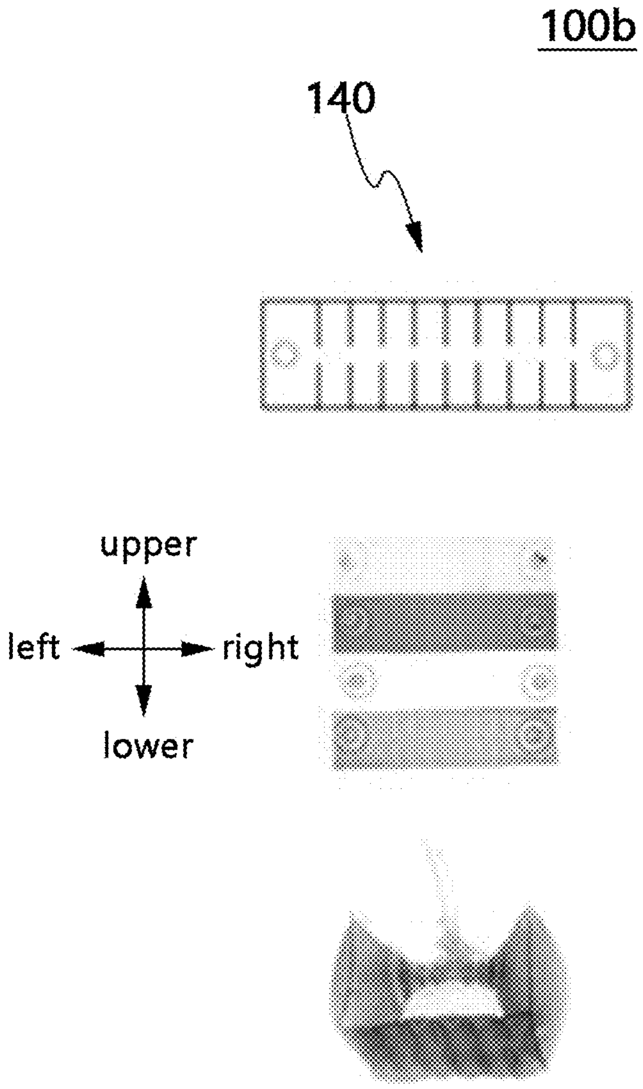
FIG. 5 is a diagram showing a second type tube of an assembly tube applied to an educational soft robot kit according to an embodiment of the present invention.
Figure 6:
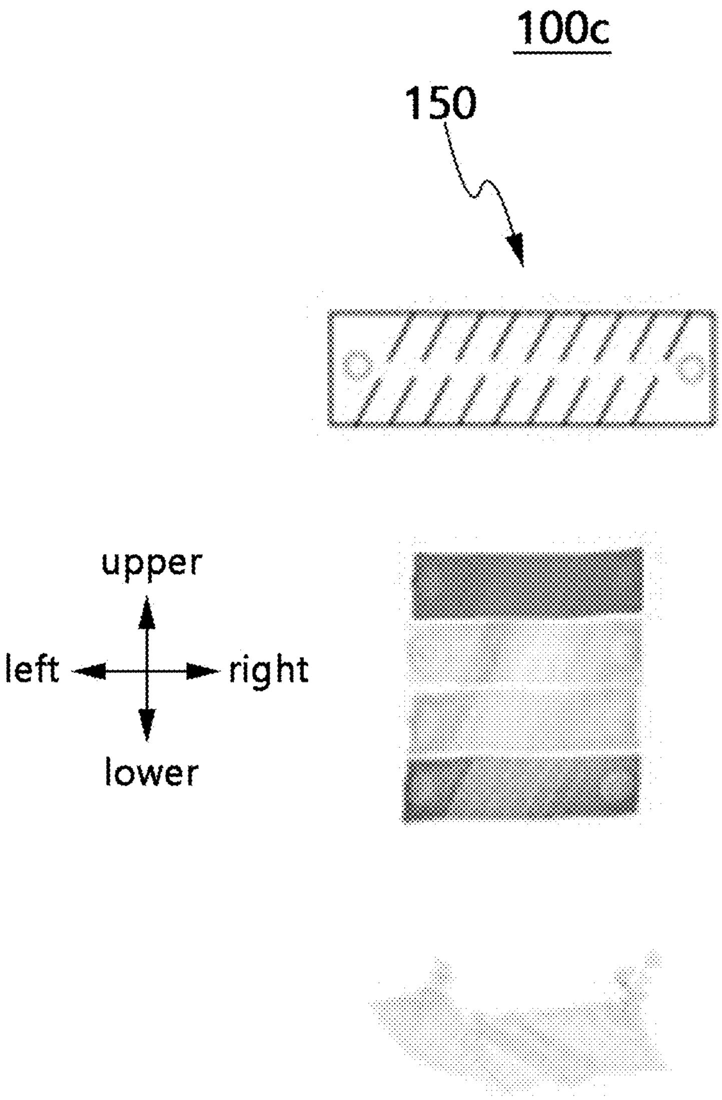
FIG. 6 is a diagram showing a third type tube of an assembly tube applied to an educational soft robot kit according to an embodiment of the present invention.

FIG. 4 is a diagram showing a first type tube of an assembly tube applied to an educational soft robot kit according to an embodiment of the present invention, FIG. 5 is a diagram showing a second type tube of an assembly tube applied to an educational soft robot kit according to an embodiment of the present invention, and FIG. 6 is a diagram showing a third type tube of an assembly tube applied to an educational soft robot kit according to an embodiment of the present invention.

Figure 7:
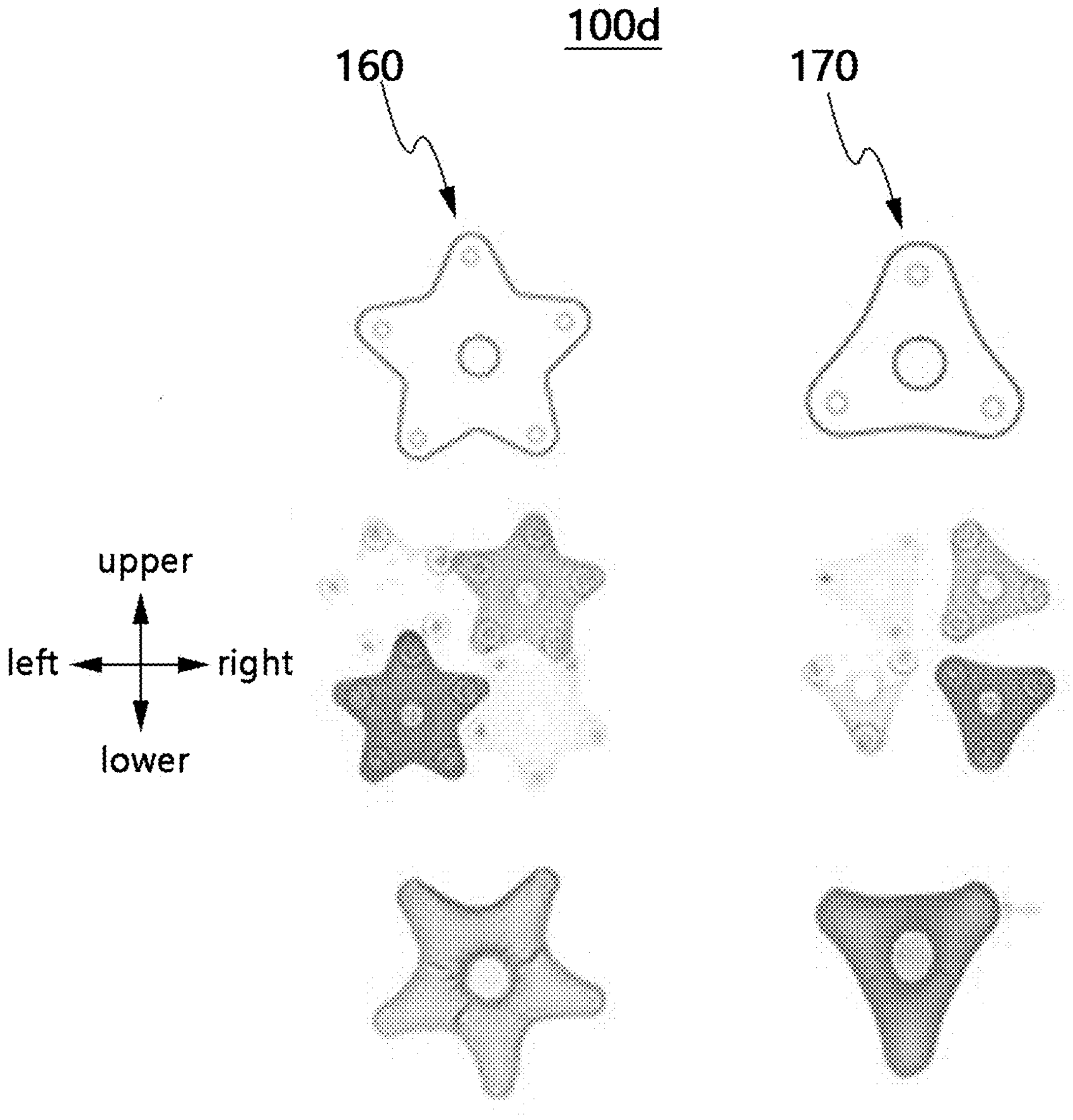
FIG. 7 is a diagram showing a fourth type tube of an assembly tube applied to an educational soft robot kit according to an embodiment of the present invention.
Figure 8:
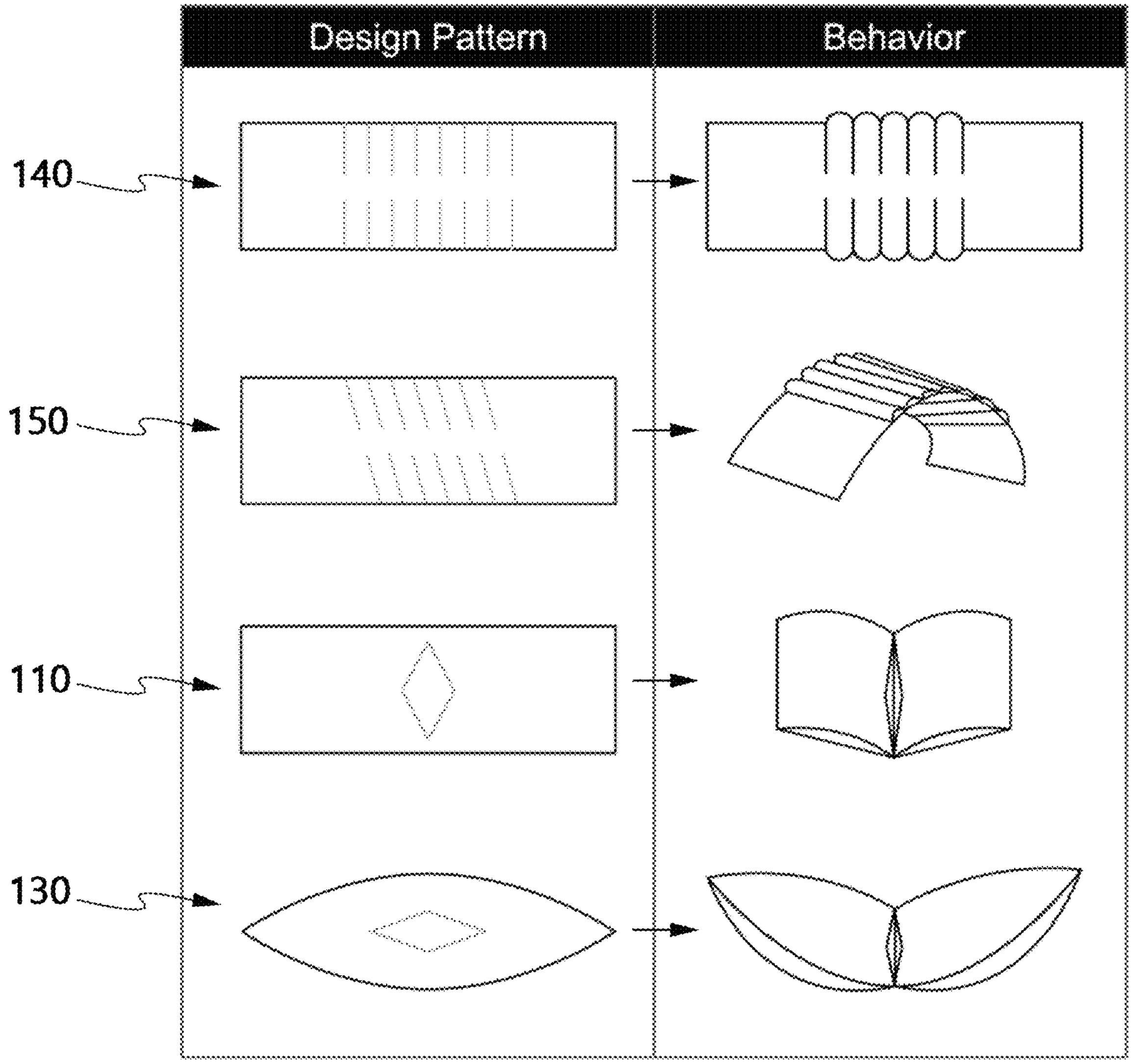
FIG. 8 is a schematic diagram showing an embodiment of a change in shape due to air injection of an assembly tube applied to an educational soft robot kit according to an embodiment of the present invention.

In addition, FIG. 7 is a diagram showing a fourth type tube of an assembly tube applied to an educational soft robot kit according to an embodiment of the present invention, and FIG. 8 is a schematic diagram showing an embodiment of a change in shape due to air injection of an assembly tube applied to an educational soft robot kit according to an embodiment of the present invention.

Meanwhile, FIGS. 9 to 15 are diagrams showing shapes A to G tubes according to first to fourth type tubes of an assembly tube applied to an educational soft robot kit according to an embodiment of the present invention.

Referring to FIGS. 4 to 15, the assembly tube 100 applied to the educational soft robot kit 1 according to an embodiment of the present invention will be described in more detail as follows.

However, the examples shown in FIGS. 4 to 15 are examples to help understand the invention, and do not limit the scope of the present invention.

As described above, the assembly tube 100 performs an operation of a substantial soft robot under the control of the controller 400.

Figure 17:
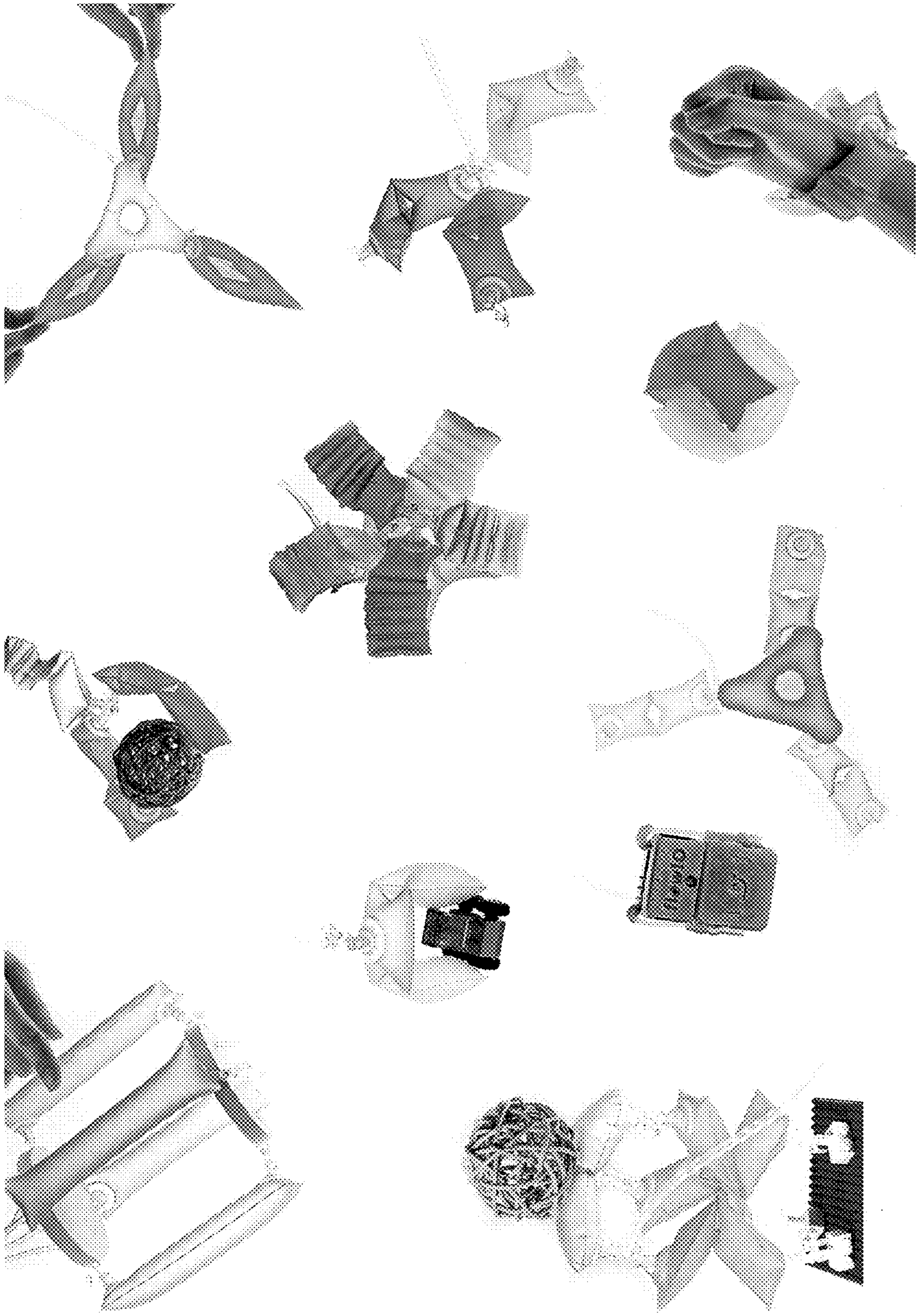
FIG. 17 is a diagram substitute photograph showing various combination forms of an educational soft robot kit according to an embodiment of the present invention.

The assembly tube 100 may show movements that a soft robot can perform, such as gently gripping an object, moving the object to another location, or performing a standing-on-its-own action through one or more connection assemblies (see FIG. 17).

To this end, the assembly tube 100 has a fusion pattern (C) that is fused while forming a passage through which air flows in the internal space of the body (A).

The assembly tube 100 applied to the educational soft robot kit 1 according to an embodiment of the present invention is made of a material that is highly durable, inexpensive, and highly expandable.

In an embodiment, the assembly tube (100) is made by a thermal compression manufacturing process in which two layers of PVC film or TPU film are overlapped on a preset-shaped mold, then pressed and sealed while heated according to the shape of the body (A) and the shape of the fusion pattern (C), and cut according to the shape.

However, this thermal compression manufacturing process is an example and is not limited thereto, and of course, if the assembly tube 100 is not damaged when performing operations such as expansion, contraction, curl, bending, and distortion depending on the amount of air injected thereto, various known manufacturing processes can be applied.

Meanwhile, the assembly tube 100 may perform operations such as expansion, restoration, contraction, curl, bending, and distortion depending on the amount of air injected thereto according to the shape of the fusion pattern (C).

As an example, this fusion pattern (C) may be a rhombus fusion pattern 112, 122, 123, and 132 having a rhombus shape (see FIGS. 4, 9, 10, and 11).

In this case, the assembly tube 100 may be a first type tube 100*a* that has at least one rhombus fusion pattern and is folded to perform a bending operation according to the amount of air injected thereto (see FIG. 4).

As another example, this fusion pattern (C) may be a straight-line fusion pattern 144 having a straight-line shape.

In this case, the assembly tube 100 may be a second type tube 100*b* that has at least one straight-line fusion pattern 144 and perform a longitudinal contraction or curl operation according to the amount of air injected thereto (see FIG. 5).

Additionally, as yet another example, this fusion pattern (C) may be an inclined line fusion pattern 154 having an inclined line shape.

In this case, the assembly tube 100 may be a third type tube 100*c* that has at least one inclined line fusion pattern 154 and performs a contraction, curl, or distortion operation according to the amount of air injected thereto (see FIG. 6).

Meanwhile, as yet another example, this fusion pattern (C) may be a plane figure fusion pattern 167 and 175 having a circular or polygonal shape.

In this case, the assembly tube 100 may be a fourth type tube 100*d* that has at least one plane figure fusion pattern 167, 175 and perform an expanding or restoring operation according to the amount of air injected thereto.

First, the first type tube 100*a* of the assembly tube 100 performs an operation by which the assembly tube 100 is folded and bent according to the position, direction, and size of the rhombus fusion pattern.

The bending operation of the assembly tube 100 by such a rhombus fusion pattern may implement an action in which a soft robot gently grips on object and moves it to a different position, and implement an action of pushing an object while bending and unfolding, and so on.

The educational soft robot kit 1 according to an embodiment of the present invention shows three shapes using the first type tube 100*a* of the assembly tube 100.

Figure 9:
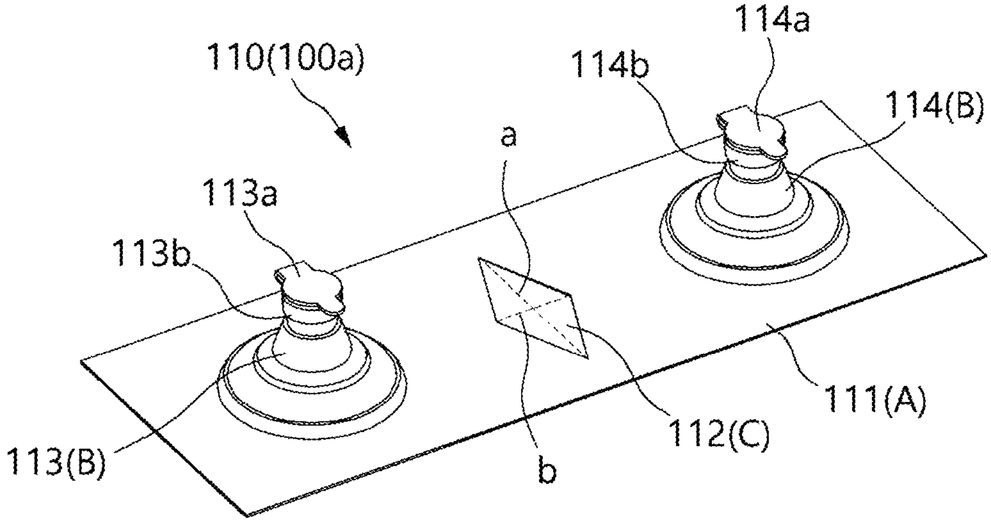
FIG. 9 is a diagram showing a shape A tube among first type tubes of an assembly tube applied to an educational soft robot kit according to an embodiment of the present invention.
Figure 10:
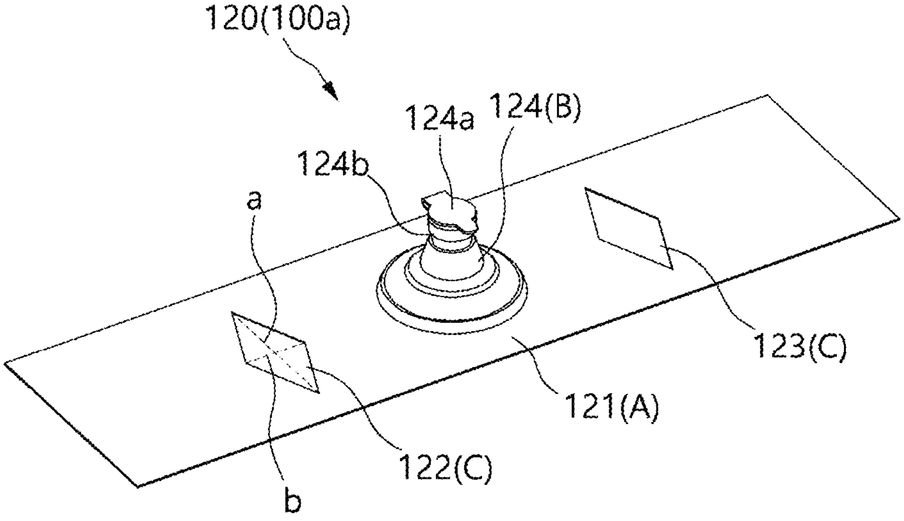
FIG. 10 is a diagram showing a shape B tube among first type tubes of an assembly tube applied to an educational soft robot kit according to an embodiment of the present invention.
Figure 11:
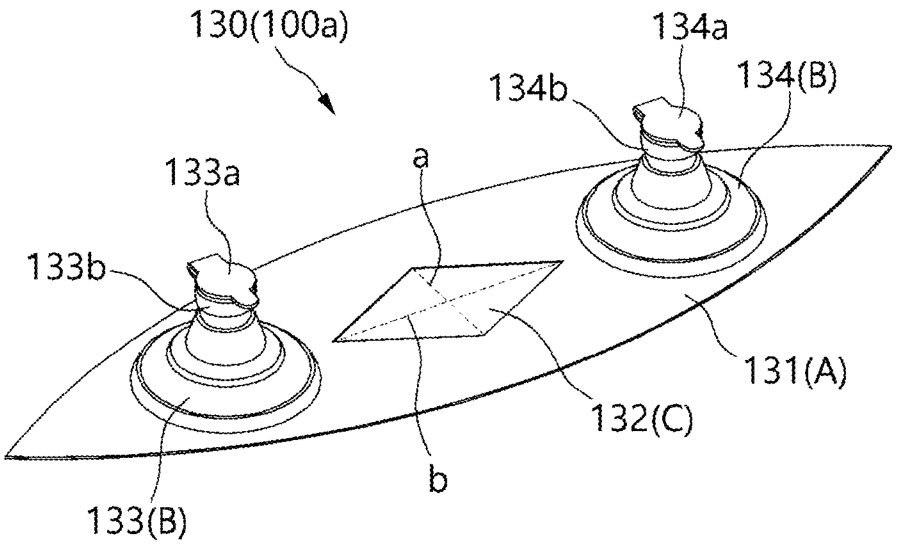
FIG. 11 is a diagram showing a shape C tube among first type tubes of an assembly tube applied to an educational soft robot kit according to an embodiment of the present invention.

The first type tube 100*a* may form a shape A tube 110, a shape B tube 120, and a shape C tube 130, as shown in FIGS. 9 to 11.

First, referring to FIGS. 4 and 9, the shape A tube 110 of the first type tube 100*a* includes a body 111 having a rectangular, sealed inner space having a long horizontal length, a rhombus fusion pattern 112 in which a vertical diagonal (a) formed at the center of the body 111 has a length longer than a horizontal diagonal (b), and a first air inlet 113 disposed on the left or right side of the rhombus fusion pattern 112.

In addition, if necessary, the shape A tube 110 may further include a second air inlet 114 disposed on the right or left side of the rhombus fusion pattern 112, corresponding to the first air inlet 113 described above.

Meanwhile, the first air inlet 113 has a hollow body 113*b* protruding from the body 111, and a stopper 113*a* for blocking air outflow is formed at the end of the body 113*b*. The shape of such an air inlet is equally applied to the second air inlet 114, and may be commonly applied to shape A to G-tubes to be described below.

However, the shape of this air inlet (B) is not limited to any one, and if air can be injected into the inner space of the assembly tube, various types of applications are possible.

Meanwhile, when air is injected into the body 111 of the above-described shape A tube 110 and it expands, the body 111 is bent at an angle with the above-described vertical diagonal (a) as an axis (see FIG. 8).

Additionally, referring to FIGS. 4 and 10, the shape B tube 120 of the first type tube 100*a* includes a body 121 having a rectangular, sealed inner space having a long horizontal length, a first rhombus fusion pattern 122 in which a vertical diagonal (a) formed on the left side of the body 121 has a length longer than a horizontal diagonal (b), a second rhombus fusion pattern 123 in which a vertical diagonal (a) formed on the right side of the body 121 has a length longer than a horizontal diagonal (b), and an air inlet 124 disposed between the first rhombus fusion pattern 122 and the second rhombus fusion pattern 123.

This shape B tube 120 is a modified example of the shape A tube 110, and when air is injected into the body 121 and it expands, the body 121 is bent at an angle with the above-described vertical diagonal (a) as an axis (see FIG. 17).

Additionally, referring to FIGS. 4 and 11, the shape C tube 130 of the first type tube 100*a* includes a body 131 having a sealed inner space of a preset shape, a rhombus fusion pattern 132 in which a horizontal diagonal (b) formed at the center of the body 131 has a length longer than a vertical diagonal (a), and a first air inlet 133 disposed on the left or right side of the rhombus fusion pattern 132.

In addition, if necessary, the shape C tube 130 may further include a second air inlet 134 disposed on the right or left side of the rhombus fusion pattern 132, corresponding to the first air inlet 133 described above.

Preferably, the body 131 of the shape C tube 130 is shown as having an eye-shaped appearance as shown in FIG. 11, but is not limited thereto, and of course, the body 131 of the shape C tube 130 may have a rectangular shape having a long horizontal length the same as the shape A tube 110 and the shape B tube 120.

This shape C tube 130 is a modified example of the shape A tube 110 and the shape B tube 120, and when air is injected into the body 131 and it expands, the body 131 is bent at an angle with the above-described vertical diagonal (a) as an axis (see FIG. 8).

In this case, since the rhombus fusion pattern 132 formed in the shape C tube 130 has a longer horizontal diagonal (b) than a vertical diagonal (a), unlike the rhombus fusion patterns 112, 122, 123 formed in the shape A tube 110 or the shape B tube 120, the shape C tube 130 may have a bending angle smaller than that of the shape A tube 110 and the shape B tube 120.

Subsequently, the second type tube 100*b* of the assembly tube 100 performs an operation by which the assembly tube 100 is contracted or curled according to the position, direction, and size of the straight-line fusion pattern 144.

This contraction or curling operation of the assembly tube 100 by the straight-line fusion pattern 144 may implement an action of a soft robot curling up an object and gently gripping it and moving it to a different position, and implement an action of pushing an object while repeating expansion and restoration.

The educational soft robot kit 1 according to an embodiment of the present invention shows the following shape using the second type tube 100*b* of the assembly tube 100.

Figure 12:
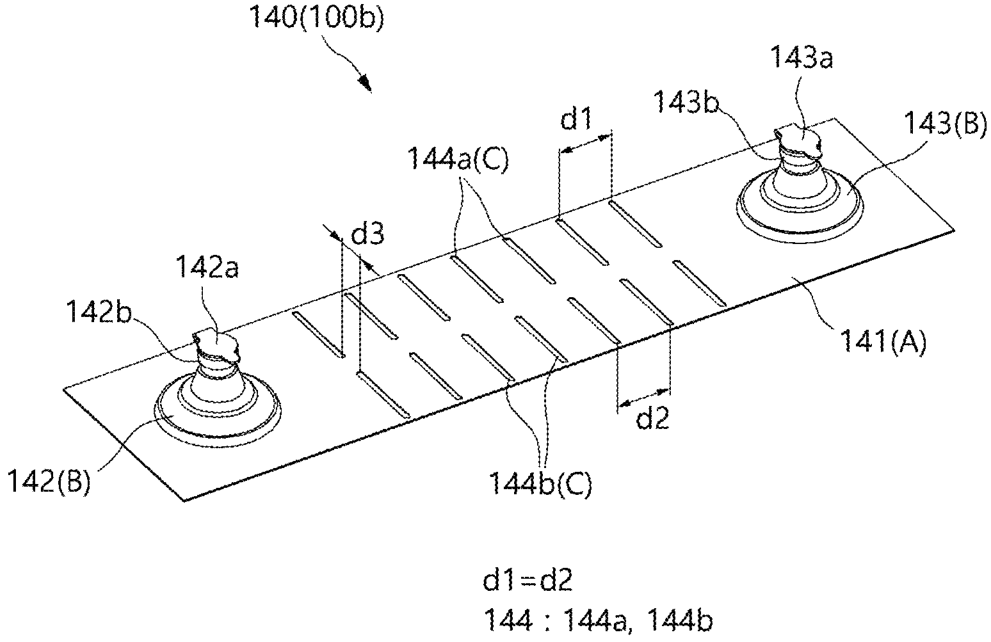
FIG. 12 is a diagram showing a shape D tube among second type tubes of an assembly tube applied to an educational soft robot kit according to an embodiment of the present invention.

The second type tube 100*b* may form a shape D tube 140, as shown in FIG. 12.

Additionally, referring to FIGS. 5 and 12 together, the shape D tube 140 includes a body 141 having a rectangular, sealed inner space having a long horizontal length, a plurality of straight-line fusion patterns 144 having intervals along the length direction of the body 141 and arranged in the same direction, and a first air inlet 142 disposed on the left or right side of the straight-line fusion pattern 144.

In addition, if necessary, the shape D tube 140 may further include a second air inlet 143 disposed on the right or left side of the straight-line fusion pattern 144, corresponding to the first air inlet 142 described above.

In this shape D tube 140, when air is injected into the body 141 and it expands, the body 141 contracts in the horizontal longitudinal direction by the straight-line fusion patterns 144 having intervals and arranged in the same direction (see FIG. 8).

In this case, the shape D tube 140 may be contracted and curled together according to the amount of air injected thereto.

Meanwhile, referring again to FIG. 12, in the shape D tube 140, the straight-line fusion pattern 144 is preferably divided into a plurality of upper straight-line fusion patterns 144*a* having an interval d1 and arranged on the upper side of the body 141, and a plurality of lower straight-line fusion patterns 144*b* having an interval d2 and arranged on the lower side of the body 141.

In this case, the upper straight-line fusion pattern 144*a* and the lower straight-line fusion pattern 144*b* have the same direction and are formed at equal intervals (d1=d2), and have an in-between interval d3 between the corresponding upper straight-line fusion pattern 144*a* and the lower straight-line fusion pattern 144*b* to form an air passage.

Meanwhile, in this straight-line fusion pattern 144, when the intervals d1 and d2 are 10 to 20 mm, the in-between interval d3 preferably has an interval of 5 to 10 mm.

If the in-between interval d3 is less than 5 mm, the space is too small to form a passage through which air can enter, and if the interval exceeds 10 mm, the passage through which air can enter may be too wide, making it difficult to implement the desired shape of contraction or curling operation.

Meanwhile, this in-between interval d3 is an embodiment and is not limited thereto, and can of course be adjusted depending on the size of the shape D tube 140.

Subsequently, the third type tube 100*c* of the assembly tube 100 performs at least one of the following operations by which the assembly tube 100 is contracted, curled, or twisted according to the position, direction, and size of the inclined line fusion pattern 154.

This operation of the assembly tube 100 by the inclined line fusion pattern 154 may implement an action of a soft robot curling up an object while being twisted and moving it to a different position, and implement an action of pushing an object while repeating expansion and restoration, and so on.

The educational soft robot kit 1 according to an embodiment of the present invention shows the following shape using the third type tube 100*c* of the assembly tube 100.

Figure 13:
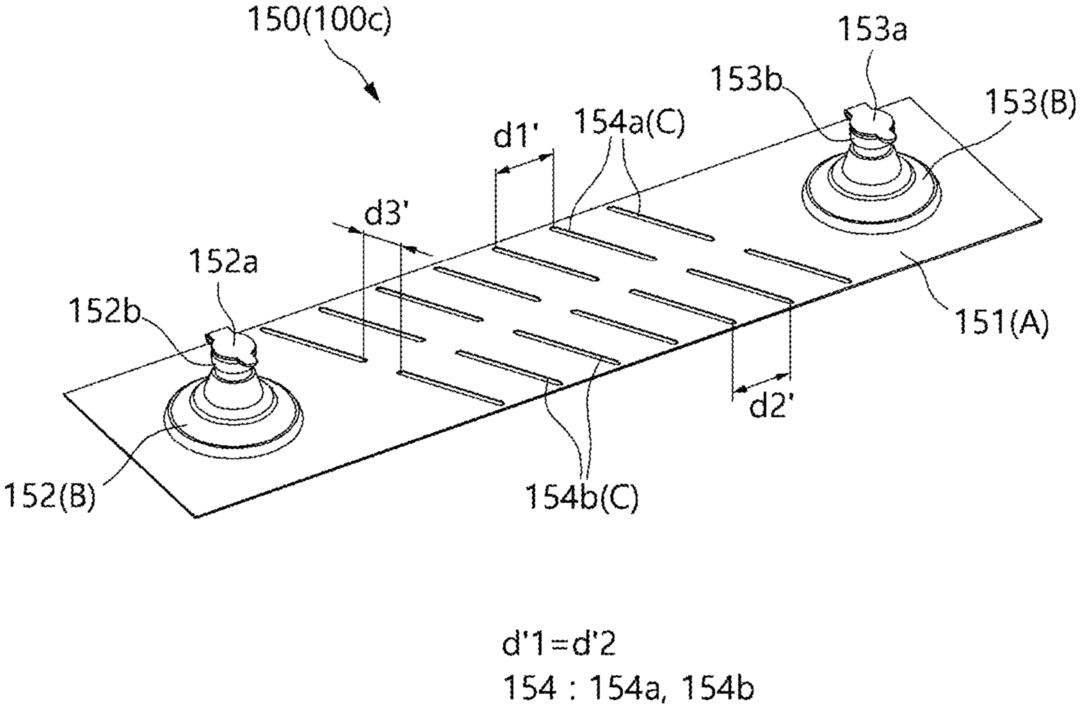
FIG. 13 is a diagram showing a shape E tube among third type tubes of an assembly tube applied to an educational soft robot kit according to an embodiment of the present invention.

The third type tube 100*c* may form a shape E tube 150, as shown in FIG. 13.

Additionally, referring to FIGS. 6 and 13 together, the shape E tube 150 includes a body 151 having a rectangular, sealed inner space having a long horizontal length, a plurality of inclined line fusion patterns 154 having intervals along the length direction of the body 151 and arranged in the same direction, and a first air inlet 152 disposed on the left or right side of the inclined line fusion pattern 154.

In addition, if necessary, the shape E tube 150 may further include a second air inlet 153 disposed on the right or left side of the inclined line fusion pattern 154, corresponding to the first air inlet 152 described above.

In this shape E tube 150, when air is injected into the body 151 and it expands, the body 151 contracts while twisting in the horizontal longitudinal direction by the inclined line fusion patterns 154 having intervals and arranged in the same direction (see FIG. 8).

In this case, the shape E tube 150 may be twisted, contracted and curled together according to the amount of air injected thereto.

Meanwhile, referring again to FIG. 13, in the shape E tube 150, the inclined line fusion pattern 154 is preferably divided into a plurality of upper inclined line fusion patterns 154*a* having an interval d1' and arranged on the upper side of the body 151, and a plurality of lower inclined line fusion patterns 154*b* having an interval d2' and arranged on the lower side of the body 151.

In this case, the upper inclined line fusion pattern 154*a* and the lower inclined line fusion pattern 154*b* have the same direction and are formed at equal intervals (d1'=d2'), and have an in-between interval d3' between the corresponding upper inclined line fusion pattern 154*a* and the lower inclined line fusion pattern 154*b* to form an air passage.

Meanwhile, in this inclined line fusion pattern 154, when the intervals d1' and d2' are 10 to 20 mm, the in-between interval d3' preferably has an interval of 5 to 10 mm.

If the in-between interval d3' is less than 5 mm, the space is too small to form a passage through which air can enter, and if the interval exceeds 10 mm, the passage through which air can enter may be too wide, making it difficult to implement the desired shape of operation.

Meanwhile, this in-between interval d3' is an embodiment and is not limited thereto, and can of course be adjusted depending on the size of the shape E tube 150.

Subsequently, the fourth type tube 100*d* of the assembly tube 100 performs an operation by which the assembly tube 100 is expanded by air injection or restored by air suction according to the position, direction, and size of the plane figure fusion pattern 167, 175.

The fourth type tube 100*d* having this plane figure fusion pattern 167, 175 may be connected to another assembly tube 100 (the first type tube 100*a*, the second type tube 100*b*, or the third type tube 100*c*) and serve as a base to support them, or may implement an operation of the soft robot desired by the user through repetition of expansion and restoration.

Preferably, the fourth type tube 100*d* forms a body having a circular or polygonal sealed inner space, and at least one of the above plane figure fusion patterns on the body, and performs an operation of expanding or restoring according to the amount of air injected thereto.

The educational soft robot kit 1 according to an embodiment of the present invention shows two shapes using the fourth type tube 100*d* of the assembly tube 100.

However, it is not limited this, and of course, various fourth type tubes 100*d* can be implemented by changing the shape of the body.

In an embodiment of the present invention, for example, the fourth type tube 100*d* may form a shape F tube 160 and a shape G tube 170, as shown in FIG. 7.

Figure 14:
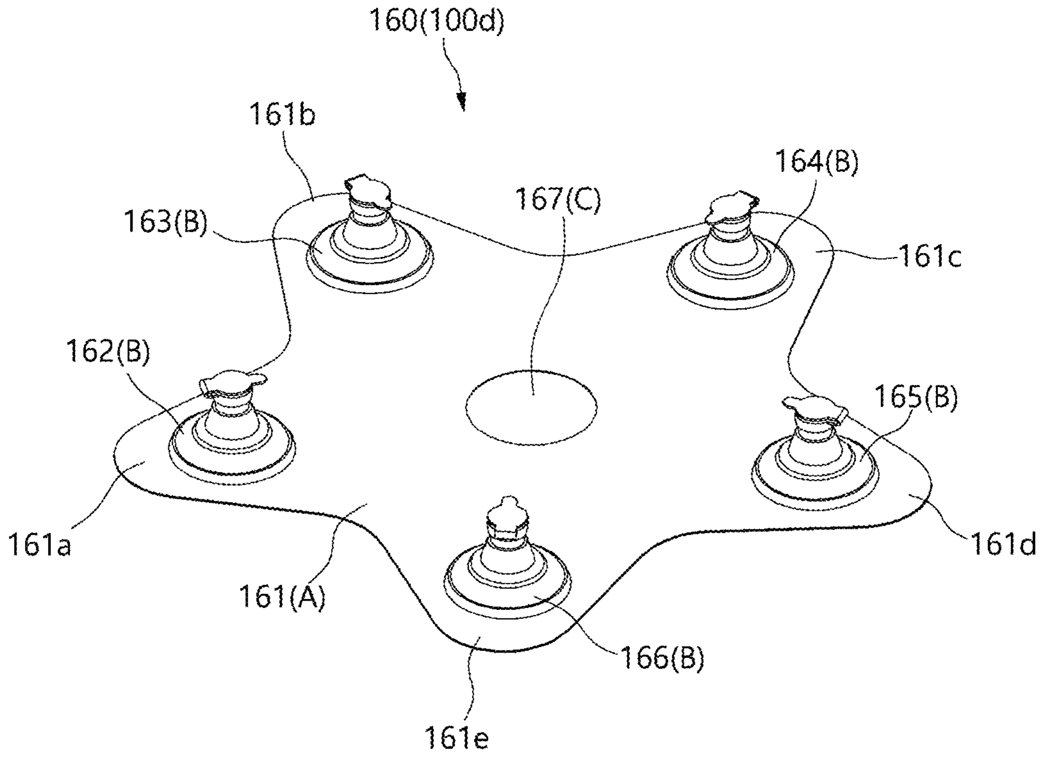
FIG. 14 is a diagram showing a shape F tube among fourth type tubes of an assembly tube applied to an educational soft robot kit according to an embodiment of the present invention.

Additionally, referring to FIGS. 7 and 14 together, the shape F tube 160 includes a body 161 having five protrusions 161*a*, 161*b*, 161*c*, 161*d*, and 161*e* protruding in a star shape and a sealed inner space; a first air inlet 162 disposed at the first protrusion 161*a* of the body 161; a second air inlet 163 disposed at the second protrusion 161*b* of the body 161; a third air inlet 164 disposed at the third protrusion 161*c* of the body 161; a fourth air inlet 165 disposed at the fourth protrusion 161*d* of the body 161; a fifth air inlet 166 disposed at the fifth protrusion 161*e* of the body 161; and a plane figure fusion pattern 167 disposed at the center of the body 161.

Figure 15:
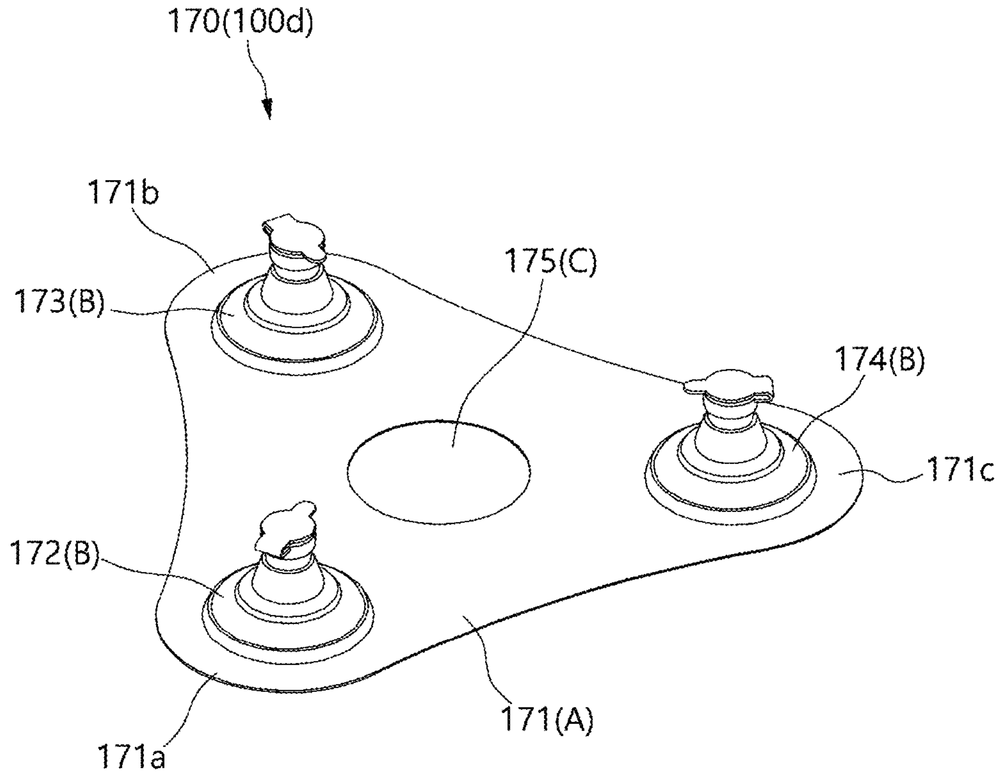
FIG. 15 is a diagram showing a shape G tube among fourth type tubes of an assembly tube applied to an educational soft robot kit according to an embodiment of the present invention.

Additionally, referring to FIGS. 7 and 15 together, the shape G tube 170 includes a body 171 having three protrusions 171*a*, 171*b*, and 171*c* protruding in a triangular shape and a sealed inner space; a first air inlet 172 disposed at the first protrusion 171*a* of the body 171; a second air inlet 173 disposed at the second protrusion 171*b* of the body 171; a third air inlet 174 disposed at the third protrusion 171*c* of the body 171; and a plane figure fusion pattern 175 disposed at the center of the body 171.

Meanwhile, although the plane figure fusion patterns 167 and 175 are shown in a circular shape as an example in FIGS. 14 and 15, it is not limited thereto, and of course, various types of figure shapes can be applied if they have a plane figure shape such as an ellipse and a polygon.

These shape F tube 160 and shape G tube 170 may perform an operation in which air is injected into the body 161, 171 to expand or restore.

Figure 16A:
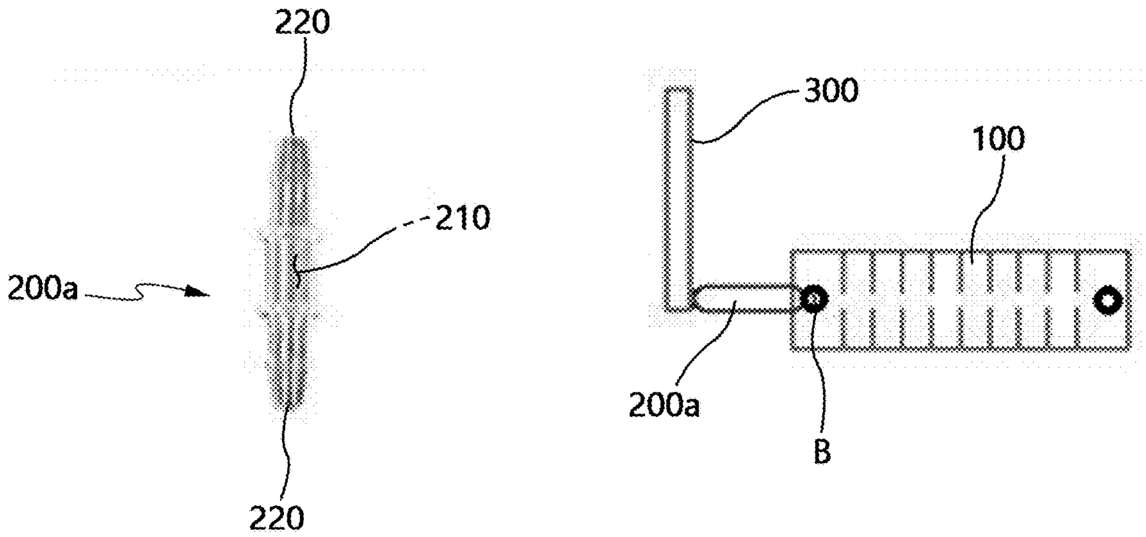
FIGS. 16A, 16B, and 16C are diagrams showing an example of a connector applied to an educational soft robot kit according to an embodiment of the present invention.
Figure 16B:
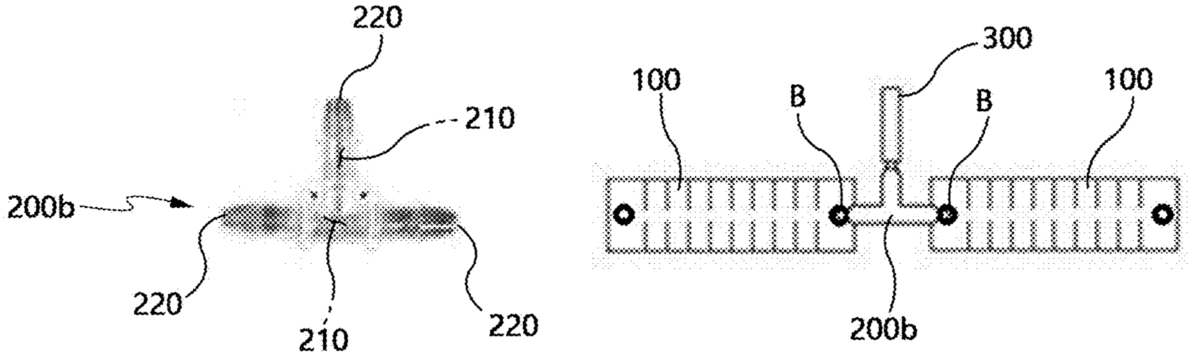
Figure 16C:
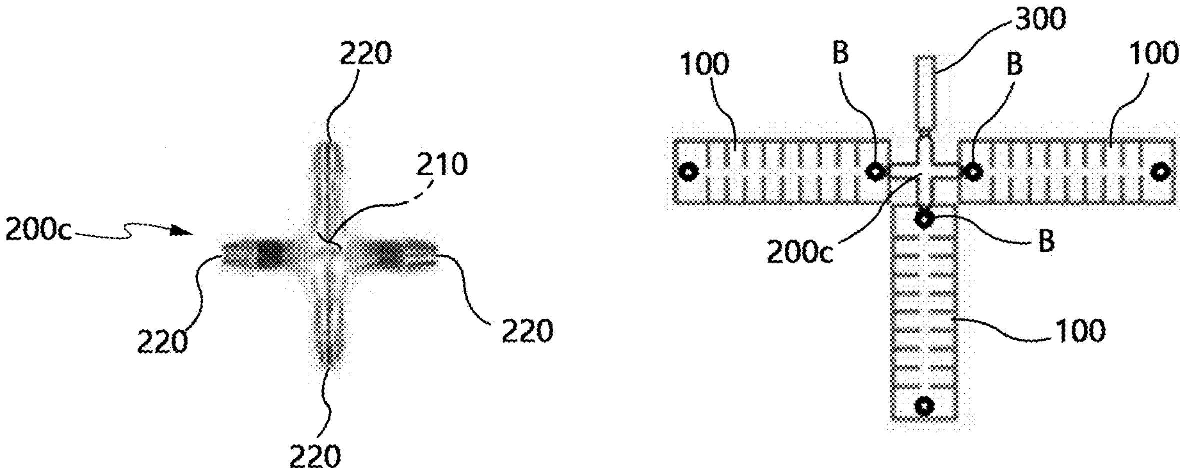

Meanwhile, FIGS. 16A, 16B, and 16C are diagrams showing an example of a connector applied to an educational soft robot kit according to an embodiment of the present invention.

The educational soft robot kit 1 according to an embodiment of the present invention allows the above-described seven types of assembly tubes 100 to be assembled using a connector 200 and to experience and learn the operation of the soft robot through various assemblies.

Referring to FIGS. 16A, 16B, and 16C, the connector 200 applied to the educational soft robot kit 1 according to an embodiment of the present invention will be described in more detail as follows.

The connector 200 serves to connect the assembly tube 100 and another assembly tube 100, and has a tubular shape having a penetrated hollow.

In an embodiment of the present invention, the connector 200 has a hard tubular shape to facilitate coupling, and preferably has any one of a linear shape, a T-shape, or a cross shape.

FIG. 16A shows a linear shape connector 200*a*.

In this case, in the linear shape connector 200*a*, a hollow 210 tube is continuous in a "|" shape, and two ends 220 with opening holes are formed at both upper and lower ends.

FIG. 16B shows a T-shape connector 200*b*.

In this case, in the T-shape connector 200*b*, a hollow 210 tube is continuous in a "⊥" shape, and three ends 220 with opening holes are formed at the left, right, and top.

FIG. 16C shows a cross shape connector 200*c*.

In this case, in the cross shape connector 200*c*, a hollow 210 tube is continuous in a "+" shape, and four ends 220 with opening holes are formed at the left, right, and top and bottom.

In the educational soft robot kit 1 according to an embodiment of the present invention, at least one assembly tube 100 may be connected and assembled using the above-described connector 200.

Meanwhile, in the above description, the connector 200 is described as having three types, but is not limited thereto, and of course, the number of ends 220 with opening holes connected to the assembly tube 100 or the air line 300 can be implemented as five or more.

In addition, of course, if necessary, the connector 200 may be formed of a soft tube.

The connector 200 has a structure in which an end 220 having an opening hole is inserted into at least one air inlet B on the assembly tube 100, and the air line 300 is connected to an end 220 to which the air inlet B is not connected.

Accordingly, the connector 200 may communicate at least one assembly tube 100 and serve as a passage through which air is injected or sucked into/from the assembly tube 100 through the air line 300 and the controller 400 described later.

FIG. 17 is a diagram substitute photograph showing various combination forms of an educational soft robot kit according to an embodiment of the present invention.

As can be seen through FIGS. 1 to 17, the educational soft robot kit 1 according to an embodiment of the present invention can implement from a simple soft robot type to a complex soft robot type using seven types of assembly tubes 100 and three types of connectors 200, thereby making it possible to experience and learn a wider range of soft robot operations.

In addition, the fusion pattern (V) of the assembly tube 100 can perform expansion, contraction, curling, and bending operations according to the amount of air injected thereto to more easily convey the understanding of the basic structure and operating principle of the soft robot.

Furthermore, by controlling the assembled soft robot form of the assembly tube 100 and the connector 200 using the controller 400 having a programmed algorithm, even non-experts can easily learn the technology of operation and detection of the soft robot.

Meanwhile, through various assemblies, the operating principles can be analyzed along with the development of new soft robot forms, so it can be used by everyone from the general public to designers, artists, and programmers to identify problems with soft robots, correct them, supplement them, and improve them.

Although exemplary embodiments of the present invention have been described, the idea of the present invention is not limited to the embodiments set forth herein. Those of ordinary skill in the art who understand the idea of the present invention may easily propose other embodiments through supplement, change, removal, addition, etc. of elements within the same idea, but the embodiments will be also within the idea scope of the present invention.

What is claimed is:

1. An educational soft robot kit, comprising:

an assembly tube having a tubular body having a sealed internal space, at least one air inlet provided in the body, and a fusion pattern that is fused while forming a passage through which air flows in the internal space of the body;

a connector having a penetrated hollow and at least two ends with an opening hole formed in a tubular shape, at least one of the ends being connected to the at least one air inlet;

an air line connected to at least one other end of the connector that is not connected to the at least one air inlet; and a controller configured to control to inject or suck air into/from the air line according to a preset programmed algorithm to control the at least one assembly tube to perform at least one operation of expansion, contraction, curling, bending, and distortion according to the amount of air injected thereto and the pattern shape of the fusion pattern.

2. The educational soft robot kit of claim 1, wherein the fusion pattern forms a rhombus fusion pattern having a rhombus shape, and the assembly tube comprises:

a first type tube that has the at least one rhombus fusion pattern and is folded to perform a bending operation according to the amount of air injected thereto.

3. The educational soft robot kit of claim 2, wherein the first type tube comprises:

a shape A tube comprising: a body having a rectangular, sealed inner space having a long horizontal length; a rhombus fusion pattern in which a vertical diagonal formed at the center of the body has a length longer than a horizontal diagonal; and a first air inlet disposed on the left or right side of the rhombus fusion pattern.

4. The educational soft robot kit of claim 3, wherein the shape A tube further comprises:

a second air inlet disposed on the right or left side of the rhombus fusion pattern.

5. The educational soft robot kit of claim 2, wherein the first type tube comprises:

a shape B tube comprising: a body having a rectangular, sealed inner space having a long horizontal length; a first rhombus fusion pattern in which a vertical diagonal formed on the left side of the body has a length longer than a horizontal diagonal; a second rhombus fusion pattern in which a vertical diagonal formed on the right side of the body has a length longer than a horizontal diagonal; and an air inlet disposed between the first rhombus fusion pattern and the second rhombus fusion pattern.

6. The educational soft robot kit of claim 2, wherein the first type tube comprises:

a shape C tube comprising: a body having a sealed inner space of a preset shape; a rhombus fusion pattern in which a horizontal diagonal formed at the center of the body has a length longer than a vertical diagonal; and a first air inlet disposed on the left or right side of the rhombus fusion pattern.

7. The educational soft robot kit of claim 6, wherein the shape C tube further comprises:

a second air inlet disposed on the right or left side of the rhombus fusion pattern.

8. The educational soft robot kit of claim 6, wherein the body has an eye-shaped appearance.

9. The educational soft robot kit of claim 1, wherein the fusion pattern forms a straight-line fusion pattern having a straight-line shape, and the assembly tube comprises:

a second type tube that has at least one straight-line fusion pattern and performs a longitudinal contraction or curl operation according to the amount of air injected thereto.

10. The educational soft robot kit of claim 9, wherein the second type tube comprises:

a shape D tube comprising: a body having a rectangular, sealed inner space having a long horizontal length; a plurality of straight-line fusion patterns having intervals along the length direction of the body and arranged in the same direction; and a first air inlet disposed on the left or right side of the straight-line fusion pattern.

11. The educational soft robot kit of claim 10, wherein the shape D tube further comprises:

a second air inlet disposed on the right or left side of the straight-line fusion pattern.

12. The educational soft robot kit of claim 10, wherein the straight-line fusion pattern is divided into:

a plurality of upper straight-line fusion patterns having an interval and arranged on an upper side of the body, and a plurality of lower straight-line fusion patterns having an interval and arranged on a lower side of the body.

13. The educational soft robot kit of claim 12, wherein the upper straight-line fusion pattern and the lower straight-line fusion pattern have the same direction and are formed at equal intervals, and have an in-between interval between the corresponding upper straight-line fusion pattern and the lower straight-line fusion pattern to form an air passage.

14. The educational soft robot kit of claim 1, wherein the fusion pattern forms an inclined line fusion pattern having an inclined line shape, and the assembly tube comprises:

a third type tube that has at least one inclined line fusion pattern and performs a contraction, curl, or distortion operation according to the amount of air injected thereto.

15. The educational soft robot kit of claim 14, wherein the third type tube comprises:

a shape E tube comprising: a body having a rectangular, sealed inner space having a long horizontal length; a plurality of inclined line fusion patterns having intervals along the length direction of the body and arranged in the same direction; and a first air inlet disposed on the left or right side of the inclined line fusion pattern.

16. The educational soft robot kit of claim 15, wherein the shape E tube further comprises:

a second air inlet disposed on the right or left side of the inclined line fusion pattern.

17. The educational soft robot kit of claim 15, wherein the inclined line fusion pattern is divided into:

upper inclined line fusion patterns having an interval and arranged on an upper side of the body, and lower inclined line fusion patterns having an interval and arranged on a lower side of the body.

18. The educational soft robot kit of claim 17, wherein the upper inclined line fusion pattern and the lower inclined line fusion pattern have the same angle and direction and are formed at equal intervals, and have an in-between interval between the corresponding upper inclined line fusion pattern and the lower inclined line fusion pattern to form an air passage.

19. The educational soft robot kit of claim 1, wherein the fusion pattern forms a plane figure fusion pattern having a circular or polygonal shape, and the assembly tube comprises:

a fourth type tube that forms a body having a circular or polygonal sealed inner space, and at least one of the above plane figure fusion patterns on the body, and performs an operation of expanding or restoring according to the amount of air injected thereto.

20. The educational soft robot kit of claim 19, wherein the fourth type tube comprises:

a shape F tube comprising: a body having five protrusions protruding in a star shape and a sealed inner space; a first air inlet disposed at the first protrusion of the body; a second air inlet disposed at the second protrusion of the body; a third air inlet disposed at the third protrusion of the body; a fourth air inlet disposed at the fourth protrusion of the body; a fifth air inlet disposed at the fifth protrusion of the body; and a plane figure fusion pattern disposed at the center of the body.

21. The educational soft robot kit of claim 19, wherein the fourth type tube comprises:

a shape G tube comprising: a body having three protrusions protruding in a triangular shape and a sealed inner space; a first air inlet disposed at the first protrusion of the body; a second air inlet disposed at the second protrusion of the body; a third air inlet disposed at the third protrusion of the body; and a plane figure fusion pattern disposed at the center of the body.

22. The educational soft robot kit of claim 1, wherein the connector has any one of a linear shape, a T-shape, or a cross shape.

23. The educational soft robot kit of claim 1, wherein the controller comprises:

a main body to which the air line is connected;

an air pressure control unit provided inside or outside the main body to inject or suck air into/from the air line; and a control unit that is linked to an external input device through a network to store a preset programmed algorithm and controls an operation of the air pressure control unit according to the algorithm.

24. The educational soft robot kit of claim 1, wherein the assembly tube is made by a thermal compression manufacturing process in which two layers of PVC film or TPU film are overlapped on a preset-shaped mold, then pressed and sealed while heated according to the shape of the body and the shape of the fusion pattern, and cut according to the shape.

* * * * *